US012635745B2

(12) United States Patent
Plank et al.

(10) Patent No.: US 12,635,745 B2
(45) Date of Patent: May 26, 2026

(54) ARTICLE OF APPAREL WITH BREATHABLE FACE COVERING

(71) Applicant: Under Armour, Inc., Baltimore, MD (US)

(72) Inventors: Kevin Plank, Baltimore, MD (US); Kyle Blakely, Baltimore, MD (US); Ella Mae Holmes, Baltimore, MD (US); Jami Dunbar, Baltimore, MD (US); Kasey Jarvis, Baltimore, MD (US)

(73) Assignee: Under Armour, Inc., Baltimore, MD (US)

(*) Notice: Subject to any disclaimer, the term of this patent is extended or adjusted under 35 U.S.C. 154(b) by 1163 days.

(21) Appl. No.: 17/581,242

(22) Filed: Jan. 21, 2022

(65) Prior Publication Data

US 2022/0142268 A1 May 12, 2022

Related U.S. Application Data

(63) Continuation of application No. 17/087,866, filed on Nov. 3, 2020, now Pat. No. 11,284,654.
(Continued)

(51) Int. Cl.
*A41D 13/11* (2006.01)
*A41D 23/00* (2006.01)
(Continued)

(52) U.S. Cl.
CPC ........ *A41D 13/113* (2013.01); *A41D 13/1161* (2013.01); *A41D 13/1192* (2013.01);
(Continued)

(58) Field of Classification Search
None
See application file for complete search history.

(56) References Cited

U.S. PATENT DOCUMENTS 4,195,629 A 4/1980 Halford
4,790,307 A 12/1988 Haber et al.
(Continued)

FOREIGN PATENT DOCUMENTS

DE 202015009034 U1 * 7/2016 .......... B01J 19/1875
DE 202020101848 U1 * 5/2020 ............. D04B 21/20
(Continued)

OTHER PUBLICATIONS https://www.apexmills.com/media_post/spacer-dome-pro-face-mask/, May 6, 2020.*

*Primary Examiner* — Bradley H Philips
(74) *Attorney, Agent, or Firm* — Maginot, Moore & Beck, LLP

(57) ABSTRACT

An article of apparel is configured to cover at least part of a human head. The article of apparel includes a multi-layer face shield and a fabric panel coupled to the face shield. The multi-layer face shield includes an outer layer, a middle layer and an inner layer and is configured to cover a mouth and a nose of the human head when the article of apparel is donned by a wearer. The fabric panel is coupled to the face shield and forms a posterior loop such that the fabric panel and face shield are configured to extend completely around the human head when the article of apparel is donned by the wearer.

17 Claims, 14 Drawing Sheets

Related U.S. Application Data

(60) Provisional application No. 63/037,223, filed on Jun. 10, 2020.

(51) Int. Cl.
*A41D 31/18* (2019.01)
*A62B 23/02* (2006.01)
*A62B 18/08* (2006.01)

(52) U.S. Cl.
CPC ........... *A41D 23/00* (2013.01); *A41D 31/185* (2019.02); *A62B 23/025* (2013.01); *A41D 2500/10* (2013.01); *A62B 18/084* (2013.01); *A62B 23/02* (2013.01)

(56) References Cited

U.S. PATENT DOCUMENTS 6,336,459 B1 1/2002 Miyake et al.
6,644,314 B1 11/2003 Elsberg
D567,365 S 4/2008 Brunell
D567,937 S 4/2008 Gerson et al.
7,677,248 B2 3/2010 Gerson et al.
D620,104 S 7/2010 Curran et al.
D638,171 S 5/2011 Goranov et al.
D646,380 S 10/2011 Gebrewold et al.
8,061,356 B2 11/2011 Bowen
D657,050 S 4/2012 Henderson et al.
8,171,933 B2 5/2012 Xue et al.
8,251,065 B2 8/2012 Kim
8,528,560 B2 9/2013 Duffy
8,640,704 B2 2/2014 Spoo et al.
8,695,603 B2 4/2014 Harold et al.
D704,824 S 5/2014 Duffy et al.
D708,734 S 7/2014 Curran et al.
8,881,729 B2 11/2014 Duffy
8,905,034 B2 12/2014 Goranov et al.
9,386,813 B2 7/2016 Nagao et al.
9,408,424 B2 8/2016 Noh et al.
D776,257 S 1/2017 Remer et al.
9,603,395 B2 3/2017 Duffy
9,603,396 B2 3/2017 Duffy
9,615,612 B2 4/2017 Duffy
9,616,258 B2 4/2017 Tsuei
9,655,392 B2 5/2017 Mekler et al.
9,770,057 B2 9/2017 Duffy
9,770,058 B2 9/2017 Angadjivand et al.
9,770,611 B2 9/2017 Facer et al.
9,826,786 B2 11/2017 Duffy
9,868,002 B2 1/2018 Duffy
9,963,611 B2 5/2018 Stewart et al.
D822,195 S 7/2018 Kwong et al.
10,136,687 B2 11/2018 Duffy
10,143,246 B2 12/2018 Houde et al.
D837,970 S 1/2019 Henderson et al.
10,182,603 B2 1/2019 Duffy
10,201,198 B2 2/2019 Tong et al.
10,227,202 B2 3/2019 Pamperin
10,238,158 B2 3/2019 Duffy
10,492,547 B2 12/2019 Weber et al.
10,494,221 B2 12/2019 Harris et al.
10,575,571 B2 3/2020 Angadjivand et al.
10,576,314 B2 3/2020 Duffy
10,602,785 B2 3/2020 Duffy
D906,628 S * 1/2021 Smith ............................ D2/500
2001/0015205 A1 8/2001 Bostock et al.
2005/0139217 A1 6/2005 Chiam
2007/0267022 A1 11/2007 Chiam
2010/0154805 A1 6/2010 Duffy et al.
2012/0030859 A1* 2/2012 Kroese ..................... D04B 1/22
2/207
2012/0160246 A1* 6/2012 Nguyen ............. A41D 13/1115
128/206.19
2012/0180800 A1 7/2012 Shibata et al.
2013/0047995 A1 2/2013 Shibata et al.
2013/0186414 A1 7/2013 Suzuki et al.
2014/0034059 A1 2/2014 Yagi
2014/0182593 A1 7/2014 Duffy
2014/0209098 A1 7/2014 Dunn et al.
2015/0013681 A1* 1/2015 Stockhamer ........... A41B 15/00
96/417
2015/0238783 A1 8/2015 Nguyen et al.
2015/0306432 A1 10/2015 Orofino
2016/0213959 A1* 7/2016 Barklow ............ A41D 13/1107
2017/0014653 A1 1/2017 Duffy
2017/0157436 A1 6/2017 Hosmer
2017/0258150 A1 9/2017 Abdulqader et al.
2017/0274228 A1 9/2017 Nguyen et al.
2017/0303608 A1 10/2017 Chen et al.
2017/0368384 A1 12/2017 Facer et al.
2018/0021608 A1 1/2018 Zhou et al.
2018/0027899 A1 2/2018 Facer et al.
2018/0146733 A1* 5/2018 Greenblat .............. A42B 1/046
2018/0154195 A1 6/2018 Henderson et al.
2018/0169447 A1 6/2018 Eitzman et al.
2018/0295906 A1 10/2018 Harris et al.
2018/0311905 A1 11/2018 Harrington et al.
2018/0368493 A1 12/2018 Houde
2018/0368494 A1 12/2018 Henderson
2019/0000162 A1 1/2019 Houde
2019/0000163 A1 1/2019 Houde
2019/0069611 A1 3/2019 Potnis et al.
2019/0126585 A1 5/2019 Potnis et al.
2020/0113256 A1 4/2020 Wagner
2021/0106976 A1 4/2021 Bohringer et al.
2023/0147043 A1* 5/2023 Baglin ............... A41D 13/1107
128/863

FOREIGN PATENT DOCUMENTS

KR 101841984 B1 * 3/2018 ............. A41D 13/11
KR 101954022 B1 * 5/2019 ........... A62B 18/084
WO 2018124504 A1 7/2018
WO 2019022020 A1 1/2019
WO 2019032041 A1 2/2019
WO 2019135150 A1 7/2019
WO WO-2021224663 A1 * 11/2021 ............. A41D 13/11

* cited by examiner

ARTICLE OF APPAREL WITH BREATHABLE FACE COVERING

CROSS-REFERENCE TO RELATED APPLICATIONS

This application is a continuation of U.S. patent application Ser. No. 17/087,866, filed Nov. 3, 2020, which claims priority for U.S. provisional patent application No. 63/037,223, filed Jun. 10, 2020, the entire contents of which are incorporated herein by reference.

FIELD

This application relates to the field of face masks and particularly to face masks for protecting against infectious diseases and particle air pollution.

BACKGROUND

Face masks are widely used to prevent the spread of infectious disease by limiting the transmission of fluids from and/or into the mouth and nose of the wearer. Face masks may also be used to protect against particle air pollution. Face masks are commonly used by medical professionals in hospitals and other medical facilities in order to limit the transmission of disease. However, during seasons of epidemic or pandemic, face masks may be widely used in association with less conventional activities. Examples of such unconventional activities include use of face masks by athletes as they participate in sporting events, fans as they watch athletic events, professionals in an office building, and hospitality workers in a restaurant or kitchen.

Typical face masks present several challenges to the wearer. First, many people find conventional face masks uncomfortable to wear, and especially masks that are made of material that is uncomfortable, that are overly-tight, or that engage too much of the face and mouth of the wearer. If the mask includes ear loops to support the mask on the face of the wearer, many people find the ear loops uncomfortable, especially when the mask is worn for long periods of time. Additionally, many face masks do not properly conform to the face of the wearer such that large gaps are formed around the perimeter of the mask between the face and the mask. This allows for the passage of unfiltered air and fluids though such gaps, and thus reduces the effectiveness of the face mask. While face masks that are more close-fitting tend to be effective at filtering air and fluids, these masks typically result in a substantial reduction in airflow for the wearer. This can make breathing difficult and labored for the wearer, especially if the mask is worn as the user participates in an activity such as walking, running, or any other athletic activity. Furthermore, many face masks are single-use masks that must be discarded after each use and/or require disposable inserts. These single-use masks result in undesirable waste and significant cost over time.

In view of the foregoing, it would be advantageous to provide a face mask that is more comfortable for the wearer while also providing an improved fit for the wearer. Additionally, it would be advantageous if such face mask included effective filtering while also allowing for increased air flow through the face mask. Furthermore, it would be advantageous if the face mask were re-usable, thus reducing waste and long-term costs of using the mask.

SUMMARY

In at least one embodiment, an article of apparel is configured to cover at least part of a human head. The article of apparel includes a multi-layer face shield and a fabric panel coupled to the face shield. The multi-layer face shield includes an outer layer, a middle layer and an inner layer and is configured to cover a mouth and a nose of the human head when the article of apparel is donned by a wearer. The fabric panel is coupled to the face shield and forms a posterior loop such that the fabric panel and face shield are configured to extend completely around the human head when the article of apparel is donned by the wearer.

In at least one embodiment, an article of apparel configured to cover at least part of a human head includes a multi-layer face shield. The face shield is configured to cover a mouth and a nose of the human head when the article of apparel is donned by a wearer. The face shield comprising an outer layer provided by a stitched fabric spacer, a middle layer provided by an open cell foam, and an inner layer provided by a fabric material.

In at least one additional embodiment, an article of apparel is configured to cover at least part of a human head and a human neck. The article of apparel includes a multi-layer face shield and a fabric panel. The face shield is configured to cover a mouth and a nose of the human head when the article of apparel is donned by a wearer. The face shield includes an outer layer, a middle layer and an inner layer, and defines an upper perimeter, a lower perimeter, and opposing lateral perimeters. The fabric panel extends around at least the lower perimeter and the opposing lateral perimeters of the face shield. The fabric panel forms a posterior loop configured to extend around a posterior the human head. The fabric panels further forms a neck portion configured to surround the human neck when the article of apparel is donned by the wearer.

DESCRIPTION

Figure 1:
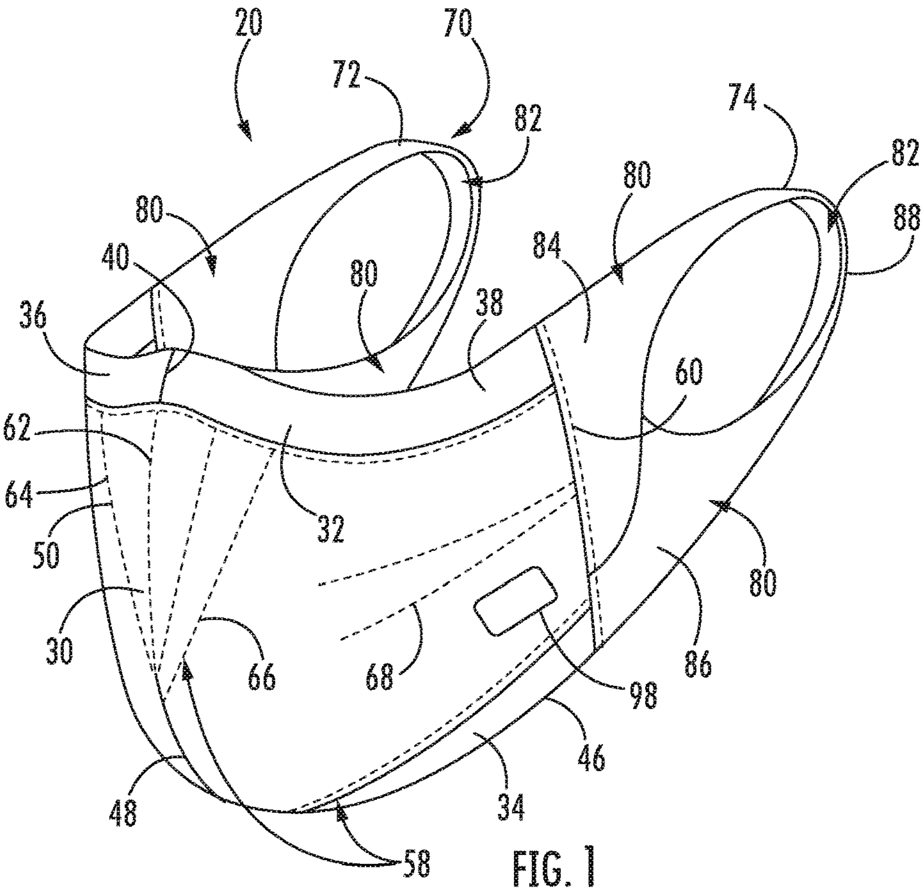
FIG. 1 shows a front perspective view of a breathable face mask including a face shield and mounting straps.

In various embodiments disclosed herein, including the embodiment of FIGS. 1-10, a face mask 20 includes a face shield 30 and mounting straps 70 in the form of ear loops 72, 74. As described in further detail below, the face mask 20 provides a comfortable, breathable mask when worn by a user. The face mask 20 includes a face shield 30 and mounting straps 70. The face shield 30 is comprised of a material that reduces the spread of droplets from the nose and mouth of the wearer while still providing a comfortable mask that provides for increased breathability. The mounting straps 70 are free-cut and secured along the side of the face shield, thus providing a comfortable mask with a secure fit. The face mask 20 is particularly adapted for wear over long periods of time, including use during sporting events and other activities. The face mask 20 is constructed of durable and washable materials and may therefore be washed and worn repeatedly without compromising the effectiveness of the mask.

Multi-Layer Face Shield

With particular reference now to FIGS. 1-5, the face shield 30 of the face mask 20 includes an upper lip 32, a lower lip 34, and a body portion 50 extending between the upper lip 32 and the lower lip 34. It will be noted that the upper lip 32 and the lower lip 34 may alternatively be referred to herein as the upper rim 32 and the lower rim 34. Said upper lip/rim 32 defines an upper perimeter portion of the face shield 30, and said lower lip/rim 34 defines a lower perimeter portion of the face shield 30.

The upper rim 32 is a strip of material that extends the upper perimeter of the face shield 30 and is configured to extend across the cheeks and nose on a human face, below the eyes of the wearer. The upper rim 32 has a length sufficient to extend across the face of the wearer, and a width between ¼ inch and 1 inch. In at least one embodiment, the width of the upper rim is about ½ inch. The upper rim 32 includes a right side 36 and a left side 38. In the embodiment of FIG. 1, the right side 36 and the left side 38 are separated by a nose dart 40. The right side 36 extends from the right ear loop 72 to the nose dart 40. Similarly, the left side 38 extends from the left ear loop 74 to the nose dart 40. The nose dart 40 is configured for placement on the nose of the wearer. In at least one alternative embodiment, the right side 36 and the left side 38 of the upper rim 32 are not separated by a nose dart, and are instead one continuous piece of fabric. For example as shown in the alternative embodiment of FIG. 11A, the nose dart 40 is not found on the upper rim 32, but is instead positioned on the center of the body portion 50, just below the upper rim 32.

The upper rim 32 is comprised of a relatively soft, flexible and somewhat elastic fabric material configured for comfort when placed against the skin of the wearer. In at least some embodiments, a combination of elastane, nylon, polyester and/or cotton fibers may be used to provide the fabric (e.g., 77% nylon and 23% spandex). In at least one embodiment, the upper rim 32 is further comprised of a material configured to wick moisture and cool the skin, such as Iso-Chill Heat Gear® fabric sold by Under Armour, Inc.

Figure 5:
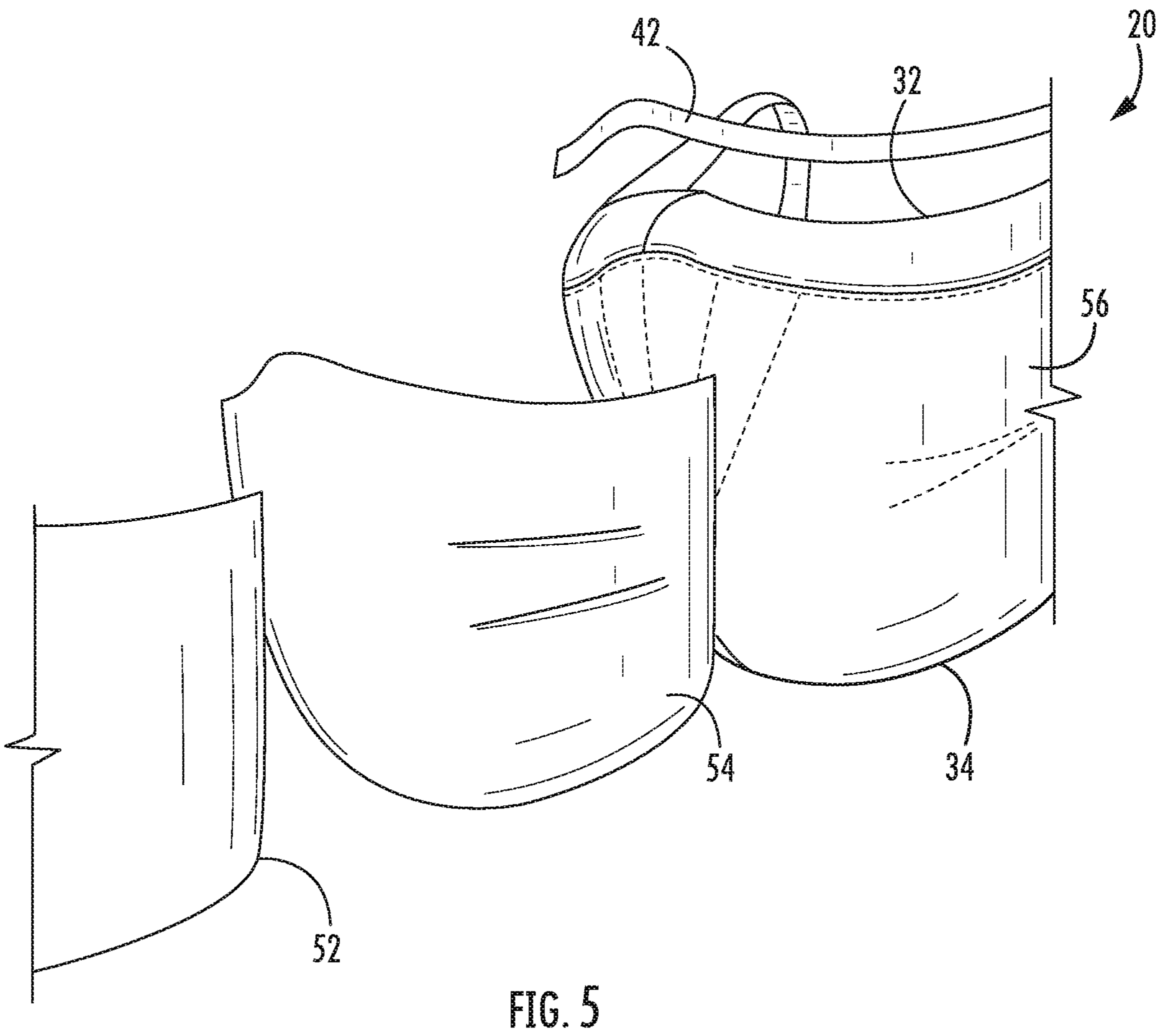
FIG. 5 shows a perspective view of three layers of material used to form the spacer portion of the face mask of FIG. 1.

As best illustrated in FIG. 5, a flexible nose bride 42 is encapsulated within the upper rim 32 (e.g., between an inner and outer layer of the upper rim), and extends from the right side 36 to the left side 38 of the upper rim. The nose bridge 42 includes a flexible metal membrane (such as aluminum) arranged within a plastic carrier. The carrier is stitched to the upper rim 32 (e.g., at the dart 40) in order to hold the nose bridge 42 in place on the upper rim 32. The nose bridge 42 is bendable and exhibits little resilience. Accordingly, the structure of the nose bridge 42 is such that it may be easily conformed/bent to match the contours of the wearer's face. Once the wearer bends the nose bridge 42, the nose bridge 42 maintains its shape and, in association with the elastic fabric of the upper rim 32, helps to retain the face shield 30 against the face of the wearer along the entire upper rim 32. The thickness of the upper rim 32 is defined by the thickness of the nose bridge 42 in combination with the thickness of a layer or two of the moisture wicking fabric that encloses the nose bridge 42. As explained in further detail below, this thickness is significantly less than that of the adjacent body portion 50. While the nose bridge 42 has been described herein as being comprised of a flexible metal membrane and carrier, it will be recognized that other configurations of the nose bridge 42 are possible. For example, in at least one embodiment, the nose bridge 42 is comprised of a tape member such as the BEMIS™ ST104 Seam Sealing Tape. In at least one embodiment, the nose bridge is comprised of a flexible silicone material that easily forms to the unique shape of the wearer's face and gradually cures over time, thus resulting in a mask that is eventually customized for a single user.

With continued reference to FIGS. 1-5 the lower rim 34 of the face shield 30 defines the lower perimeter of the face shield 30 and is configured to extend across the lower part of a human face, under the jaw of the wearer. Similar to the upper rim 32, the lower rim 34 has a width of between ¼ inch and 1 inch; in at least one embodiment the width of the lower rim 34 is about ½ inch. The lower rim 34 includes a right side 44 and a left side 46 separated by a chin dart 48. The right side 44 extends from the right ear loop 72 to the chin dart 48. Similarly, the left side 46 extends from the left ear loop 74 to the chin dart 48. The chin dart 48 is configured for placement on the chin of the wearer. In at least one alternative embodiment, the right side 44 and the left side 46 of the lower rim 34 are not separated by a chin dart, and are instead one continuous piece of fabric. For example as shown in the alternative embodiment of FIG. 11A, the chin dart 48 is not found on the lower rim 34, but is instead positioned on the center of the body portion 50, just above the lower rim 34.

The shape of the lower rim 34 is such that it closely follows the contours of a human jaw line, extending from a center position under the chin and rearwardly on the left and right sides to positions near the angles of the jaw. Like the upper rim 32, the lower rim 34 is also comprised of a relatively soft, elastic and flexible fabric material configured for comfort when placed against the skin of the wearer. The material may be further configured to wick moisture and cool the skin. Because the material is relatively elastic, it is capable of stretching and conforming to the contours of the wearer's jaw and chin.

The body 50 of the face shield 30 is positioned between the upper rim 32 and the lower rim 34. Like the upper rim 32 and the lower rim 34, the body 50 also extends from the right ear loop 72 to the left ear loop 74. The body 50 of the face shield is configured to substantially cover the lower portion of the wearer's face, including the nose and the mouth of the wearer. The body 50 of the face shield is advantageously comprised of a multi-layer construction that limits the transmission of moisture from the wearer's mouth and nose while also offering increased breathability relative to conventional face masks. In particular, as shown in FIG. 5, the body 50 includes an outer layer 52, a middle layer 54 and an inner layer 56.

The outer layer 52 of the body 50 provides an airgap spacer for the face shield 30. The outer layer 52 is comprised of a material that offers both structure for the face shield as well as a moisture barrier. The material of the outer layer 52 is generally a lightweight fabric, but still provides the face shield 30 with sufficient structure and body to keep the face shield largely separated from the mouth, nose, and surrounding skin of the wearer at the interior of the face shield 30. This separation provides for a mask that is significantly more comfortable for the wearer than conventional face masks and also allows for better airflow. The material of the outer layer also provides good moisture holding capacity for moisture vapor, while also inhibiting moisture from passing therethrough.

In at least one embodiment, the outer layer 52 is comprised of a stitched fabric spacer, and particularly a circular knit spacer that is itself a three layer fabric made of 100% polyester. The circular knit spacer includes a first knit fabric layer provided parallel to a second knit fabric layer and separated by a space defined by another yarn. The polyester threads that form the first knit fabric layer provide for a generally smooth first surface that is parallel to a generally smooth second surface provided by the polyester threads of the second knit fabric layer (i.e., if the threads of the first knit fabric layer are considered to be in a first plane, the threads of the second knit fabric layer may be considered to be in a second plane that is parallel to the first plane). A number of crossing threads/yarns extend through the space and connect the first and second knit fabric layers (i.e., the crossing threads may be considered to extend perpendicular to the threads of the first knit fabric layer and the second knit fabric layer). The crossing threads are interknitted with the threads of the first and second knit fabric layers such that the first knit fabric layer is bound to the second knit fabric layer without the need for glues or other adhesives. The crossing threads provide the fabric with air pockets that add significant body to the fabric, resulting in a structure that has greater strength and maintains its form better than most fabrics. An exemplary construction of such a three layer fabric is disclosed in U.S. Pat. No. 4,785,558 to Shiomura, the entire contents of which are incorporated herein by reference. It will be recognized that the outer layer 52 is a stitched fabric layer, not a molded layer. This provides the mask with many of the advantages of fabrics, including increased comfort, flexibility, breathability, washability, and sustainability, and does not incorporate the downsides of molded structures, such as stiffness, limited airflow, and single use. In at least one embodiment, the yarns that form the first and second fabric layers are provided by a 100 denier 100% polyester yarn, and the crossing threads are provided by a 30 denier 100% polyester yarn.

In addition to the three layer fabric structure, the outer surface of the outer layer 52 is treated with a durable water repellant (DWR) finish. This DWR finish inhibits moisture from penetrating the outer layer 52 and moving into the mask. This provides the wearer with additional protection against moisture droplets that may be deposited on the face shield 30 from an outside source. In at least one embodiment, the DWR finish is provided by a C0 DWR material that prevents absorption from the outside while also making the finish more environmentally friendly.

As best shown in FIG. 5, the middle layer 54 is sandwiched between the outer layer 52 and the inner layer 56. The middle layer 54 is comprised of a reticulated open cell foam. In at least one embodiment, the foam is 100% polyurethane. The open cell structure of the foam facilitates air-flow. At the same time, the structure of the foam has a high moisture holding capacity. Moisture droplets that enter the foam tend to remain in the foam until they are flushed out; moisture does not wick into or out of the foam. The middle layer 54 is about ⅛ inch (3.17 mm) in thickness, and typically between 1/16 and ¼ inch (1.58 mm-6.35 mm). Accordingly, the middle layer is sufficiently thick to retain moisture, but not so thick that it is overly insulative and limits breathability.

Figure 8:
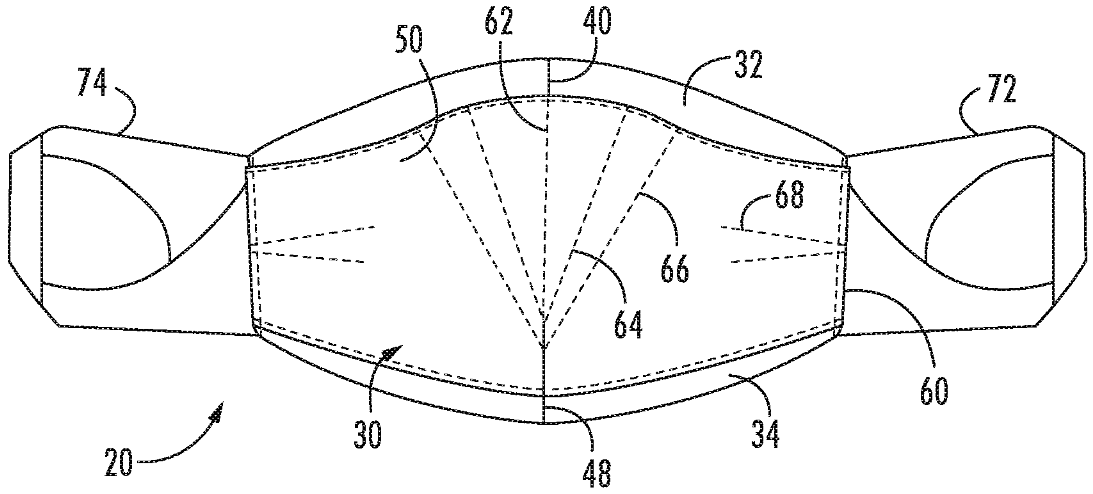
FIG. 8 shows a rear view of the face mask of FIG. 1 laid in a flat configuration.
Figure 10:
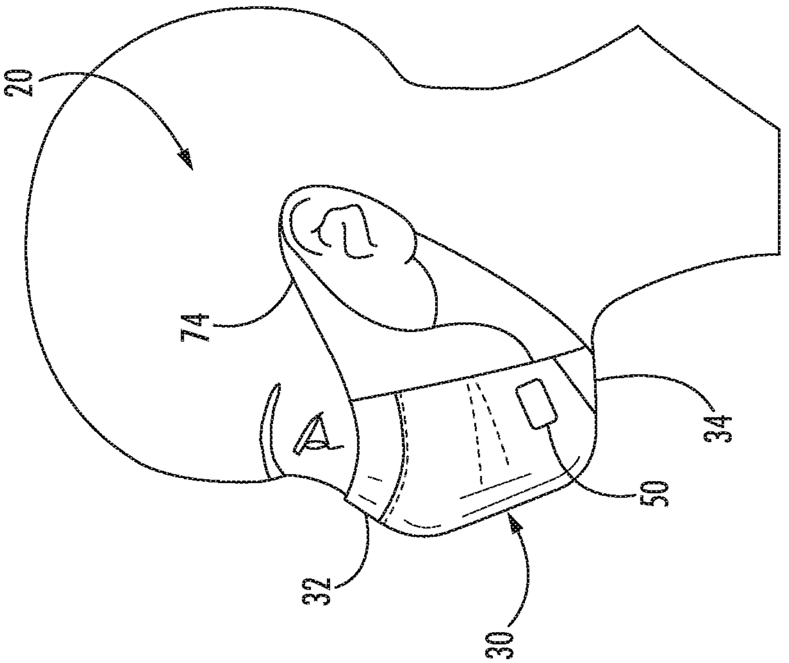
FIG. 10 shows a left side view of the face mask of FIG. 1 worn on a human head.
Figure 9:
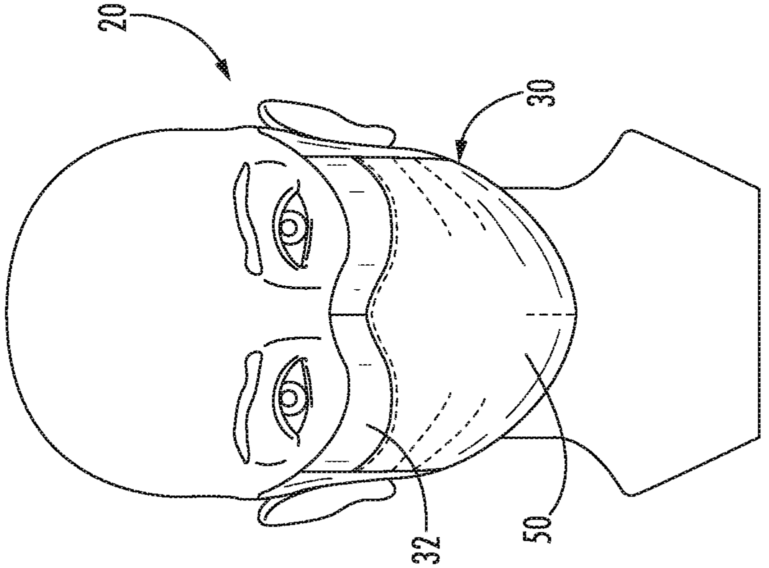
FIG. 9 shows a front view of the face mask of FIG. 1 worn on a human head.

The inner layer 56 is the same material as that used to form the upper rim 32 and lower rim 34. In particular, the inner layer 56 is comprised of a relatively soft and flexible stretch fabric material configured for comfort when placed against the skin of the wearer, such as Iso-Chill Heat Gear® fabric sold by Under Armour, Inc. The material is further configured to wick moisture and cool the skin. As shown in FIG. 8, the entire inner surface of the face shield 30 is comprised of a relatively soft, comfortable, and moisture wicking material. Because the inner layer 56 faces the wearer, the inner layer 56 wicks moisture from the mouth and nose of the wearer into the middle layer 54, where the moisture is retained until it is flushed from the mask during washing. As a result, the inner layer 56 tends to remain relatively dry and does not become saturated with moisture droplets during use. In at least one embodiment, the inner layer is comprised of a knit warp fabric having a tricot construction and comprising 77% Polyamide, 23% Spandex. The fabric not only wicking, but also configured to provide a cooling effect, drawing both moisture and heat away from the skin of the wearer.

In at least one embodiment, the fabric providing the inner layer 56 is treated with an antiviral/antimicrobial compound designed to kill harmful viruses and/or other microbes that may be dispelled from the mouth and nose of the wearer. For example, the inner layer 56 may be treated with an antiviral chemical, such as PROTX2 AV, produced by Intelligent Fabric Technologies of North America. In tests PROTX2 AV has destroyed 99.9% of COVID-19 within 10 minutes, with residual killing power for 24 hours. In some embodiments, the antimicrobial compound may be mechanical and/or chemical in nature, such a crystalline structure that may be bonded to the surface, or a chemical treatment applied to the surface, as will be recognized by those of ordinary skill in the art. In at least some embodiments, the antimicrobial compound may be conveniently applied during the textile finishing process without requiring additional machinery or steps. In at least some embodiments, only the portion of the inner layer 56 that forms the face shield 30 or the body portion 50 of the face shield is treated with the antiviral/antimicrobial compound. For example, the upper rim 32, lower rim 34, and ear loops 72, 74 may not be treated with the antiviral/antimicrobial compound even though these portions of the face mask are comprised of the same type of fabric that forms the inner layer 56. As a result, the cost of producing the face mask is reduced and issues are avoided that relate to the changes in fabric texture or other conditions for portions of the mask designed to engage the skin of the wearer.

The inner layer 56, middle layer 54, and outer layer 52 of the face shield body 50 are all tethered together at various locations with stitching 58 extending through each of the layers. As best shown in FIGS. 1-2 and 7-8, the stitching 58 includes perimeter stitching 60, center-line stitching 62, inner-V stitching, 64, outer-V stitching, 66, and lateral stitching 68. The perimeter stitching 60 extends around the perimeter of the body 50 of the face shield 30, including along the upper rim 32, the right ear loop 72, lower rim 34, and the left ear loop 74. The center-line stitching 62 extends along a central line of the face shield 30 from the nose dart 40 to the chin dart 48. The inner V-shaped stitching 64 is centered relative to the center-line stitching 62 (i.e., the point of the V lies along the center-line) with the top of the V positioned at the perimeter of the upper rim 32 and the point of the V positioned at a near mid-point on the center-line. The outer V-shaped stitching 66 is positioned outside of the inner V-shaped stitching 64. Similar to the inner V-shaped stitching 64, the outer V-shaped stitching 66 is centered relative to the center-line stitching 62 with the top of the V positioned at the perimeter of the upper rim 32 and the point of the V positioned at a lower side of the body 50. This dual-V arrangement and center-line stitching 62, 64, 66 together form a grill on the front of the face shield 30 that advantageously helps to shape the face shield 30 when in use such that it bows outwardly away from the mouth and nostrils of the wearer, and thus provides additional space for the wearer.

Figure 2:
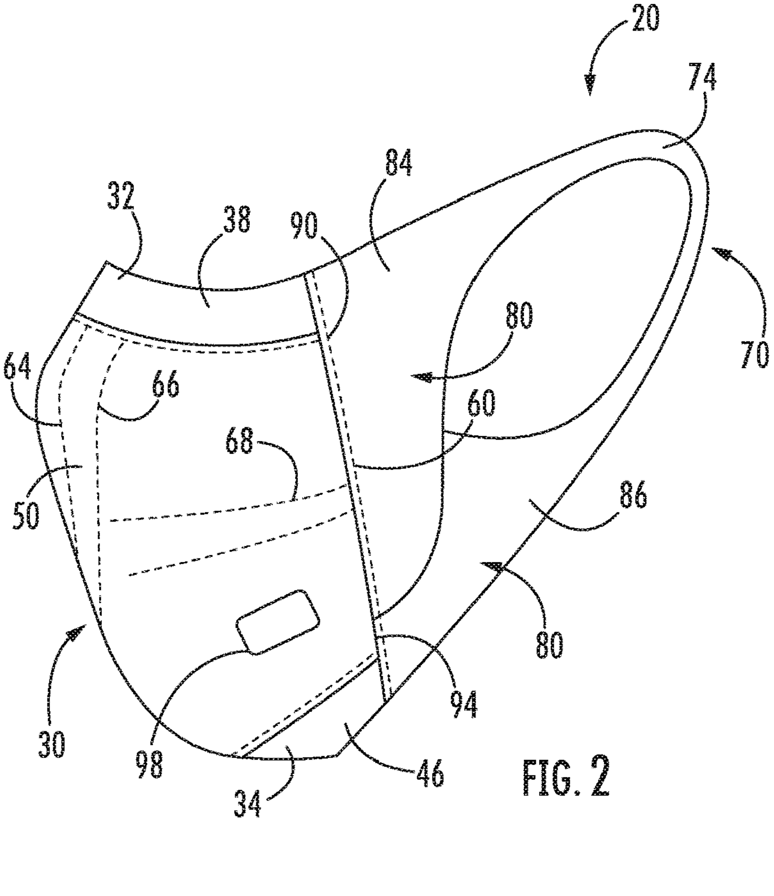
FIG. 2 shows a side view of the face mask of FIG. 1.
Figure 3:
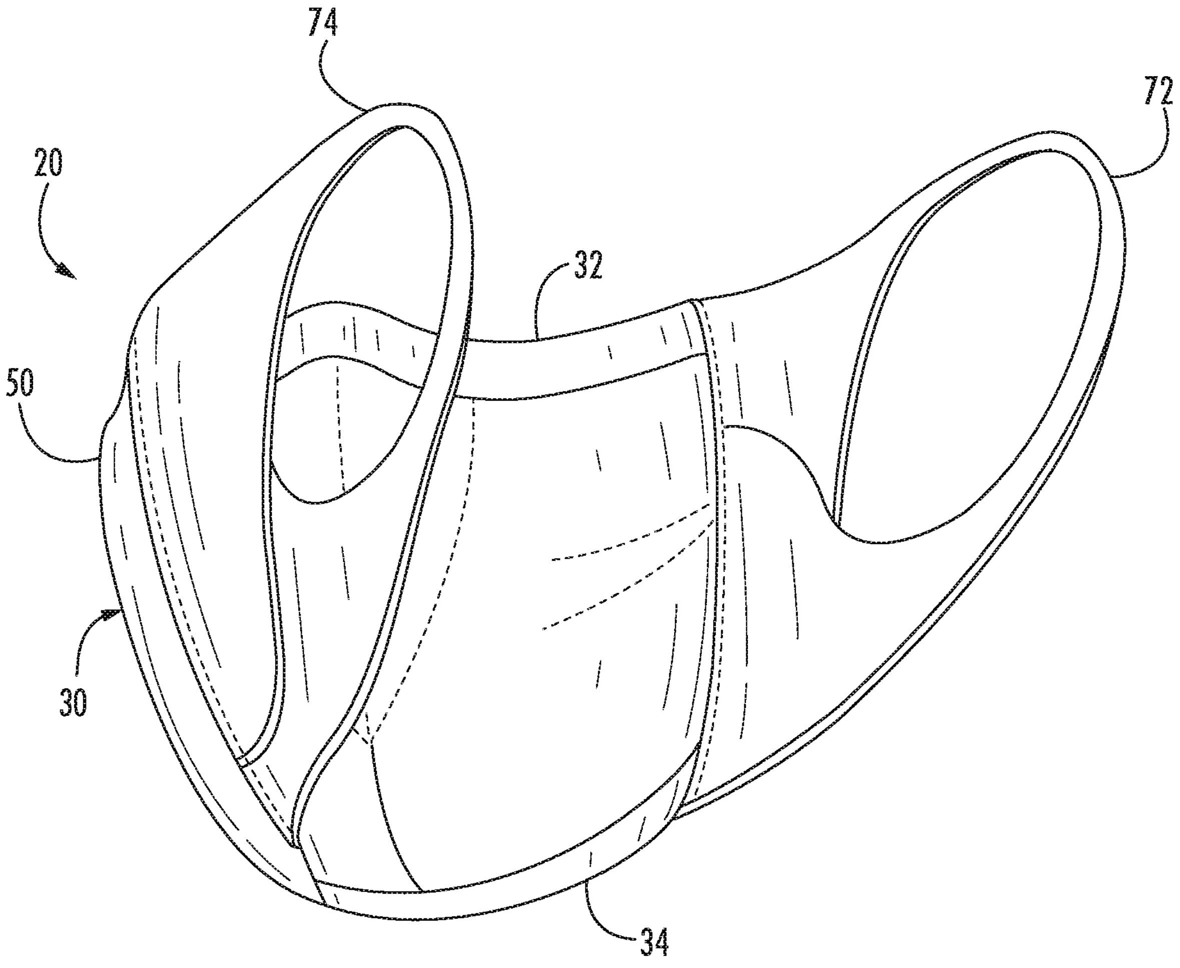
FIG. 3 shows a rear perspective view of the face mask of FIG. 1.

The lateral stitching 68 extends inwardly from the left and right perimeters of the face shield 30 and then terminates on the body 50 prior to reaching the outer V-shaped stitching 66. As shown in FIGS. 1 and 2, the lateral stitching 68 includes an upper stitch line that diverges from a lower stitch line as the stitch lines extend inwardly from the lateral side of the face shield 30 toward a central portion of the face shield. This stitching 68 also assists in properly shaping the mask when in use in order to provide a structure that spaces the mask away from the face, and particularly the nostrils and mouth of the wearer.

It will be recognized that, other than the above-described stitching, there is no fastening or other connection between the layers 52, 54, 56 of the body. Accordingly, the layers of the body can somewhat shift and/or slide relative to one another at locations removed from the stitching. No glues or other adhesives that might limit breathability/air flow are included on the mask 20 to couple any of the components together, including no glues or other adhesives on the body 50 to couple the layers 52, 54, 56 together, and no adhesives to couple the mounting straps 70 to the face shield 30.

As noted previously, because the outer layer 52 (i.e., the spacer) has significant body, it provides a structure that does not tend to drape against the skin of the wearer. Instead, the outer layer 52 is less flexible than the other layers and tends to stand-up. As a result the outer layer serves to distance the face shield 30 away from the wearer's nostrils, lips and other skin near the center of the face shield 30. Along the lateral perimeters of the face shield 30, the ear loops 72, 74 pull the outer layer 52 (and the associated middle layer 54 and inner layer 56) toward the user's face such that the inner layer 56 engages the skin of the wearer along the lateral perimeters of the face shield 30. At the same time, the outer layer 52 does not extend to the upper rim 32 and the lower rim 34, and the inner layer 56 material that extends to the upper rim 32 and lower rim 34 is not dominated or otherwise controlled by the outer layer 52. As a result, the upper rim 32 and the lower rim 34 are adapted to easily conform to the curvature of the wearer's face. Thus, the entire perimeter of the face shield 30, including the upper rim 32, lower rim 34, and lateral perimeters are close-fitting on the face of the wearer and offers a secure face shield with very few, if any, gaps or other openings formed around the perimeter of the face shield 30 and the skin of the wearer. At the interior of the face shield 30 the structure of the outer layer 52 pulls the inner layer 56 away from the face and lips of the wearer, thus making the mask more comfortable for the wearer.

Figure 6:
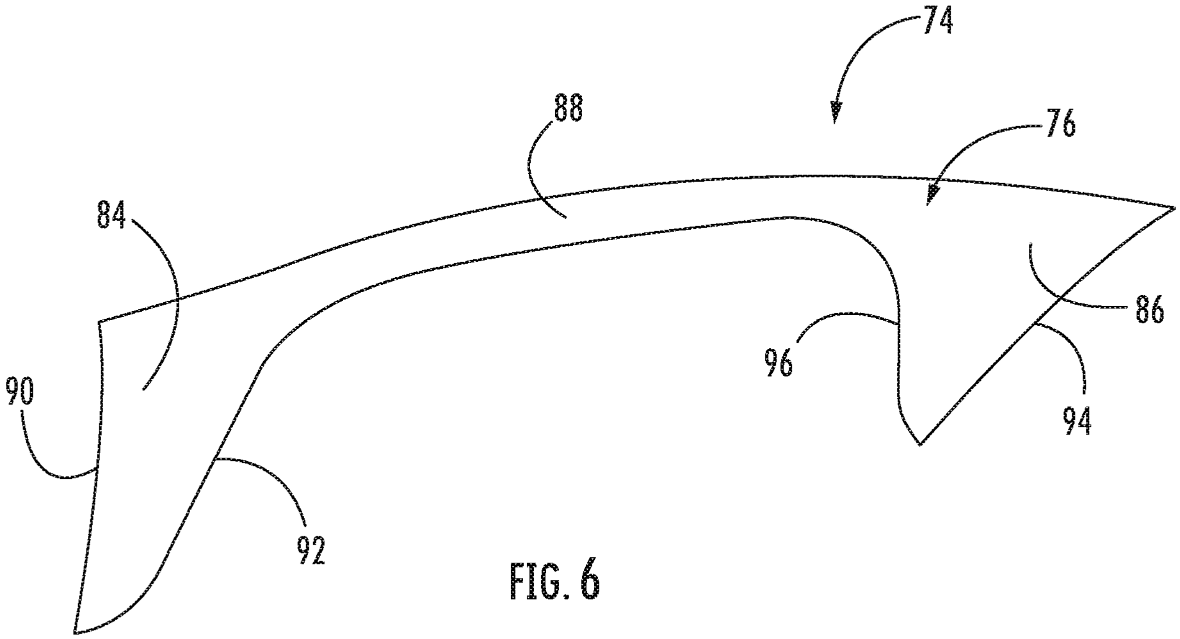
FIG. 6 shows a plan view of the free-cut ear loop of the face mask of FIG. 1.
Figure 7:
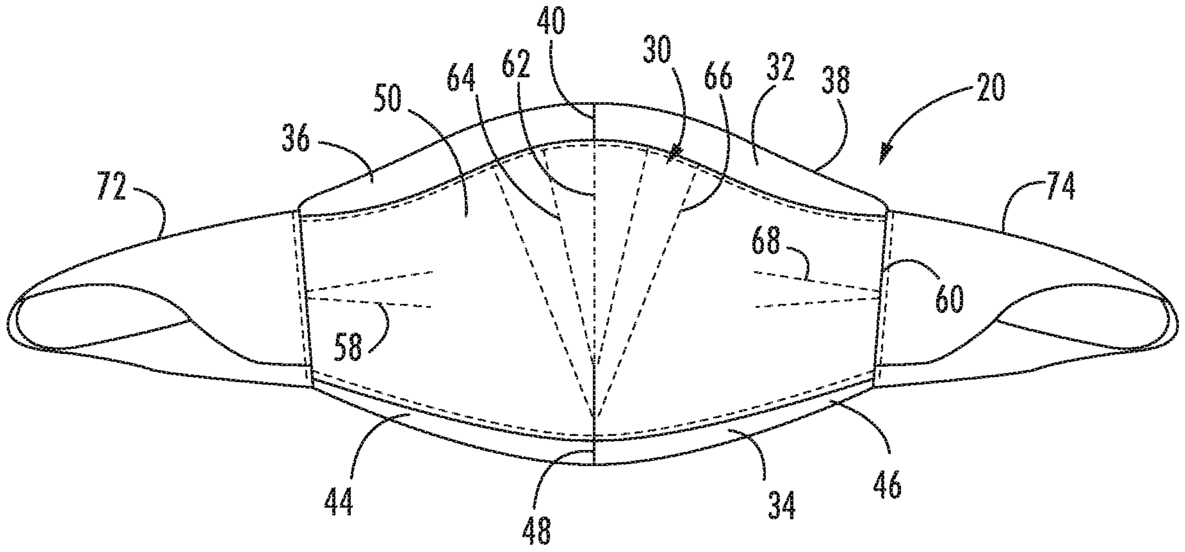
FIG. 7 shows a front view of the face mask of FIG. 1 laid in a flat configuration.

As noted above, the body portion 50 of the face shield 30 is a three-layer structure, while the upper rim 32 and lower rim 32 is a single-layer structure. In particular, the body portion 50 includes a foam layer sandwiched between an airgap spacer and a wicking fabric material, while the upper rim 32 and lower rim 34 only include the wicking fabric. This makes the body portion 50 of the face shield 30 significantly thicker than the upper rim 32 and lower rim 34. For example, the body portion 50 may have a total thickness of about ¼ inch (e.g., between ⅛ inch and ⅜ inch), while the upper rim 32 and lower rim 34 each typically have a total thickness of about 1/16 inch (e.g., between 1/32 and ⅛ inch). Advantageously, this provides additional comfort and long-term wearability for the mask. As illustrated in FIGS. 6 and 7, the material forming the upper rim 32 is comfortable against the skin and nicely conforms to the wearer's face. Additionally, because this material is thin, and easily manipulated with the nose brides 42, it may be retained closely against the wearer's face. This not only helps to limit the transmission of fluids in the area of the upper rim 32, but also prevents fogging when the wearer uses the mask 20 while also wearing eyeglasses or sunglasses. Furthermore, because the material forming the lower rim 34 is relatively thin and elastic, it also nicely conforms to the wearer's jaw and chin. At the same time, the thicker body portion 50 has substantial structure and increased body, thus allowing this portion of the mask to maintain a shape and remain removed from much of the wearer's nose, mouth, lips, and surrounding skin. As a result, the face shield 30 of the mask includes numerous features that allow the mask to provide increased protection, breathability, and comfort for the wearer.

Figure 11A:
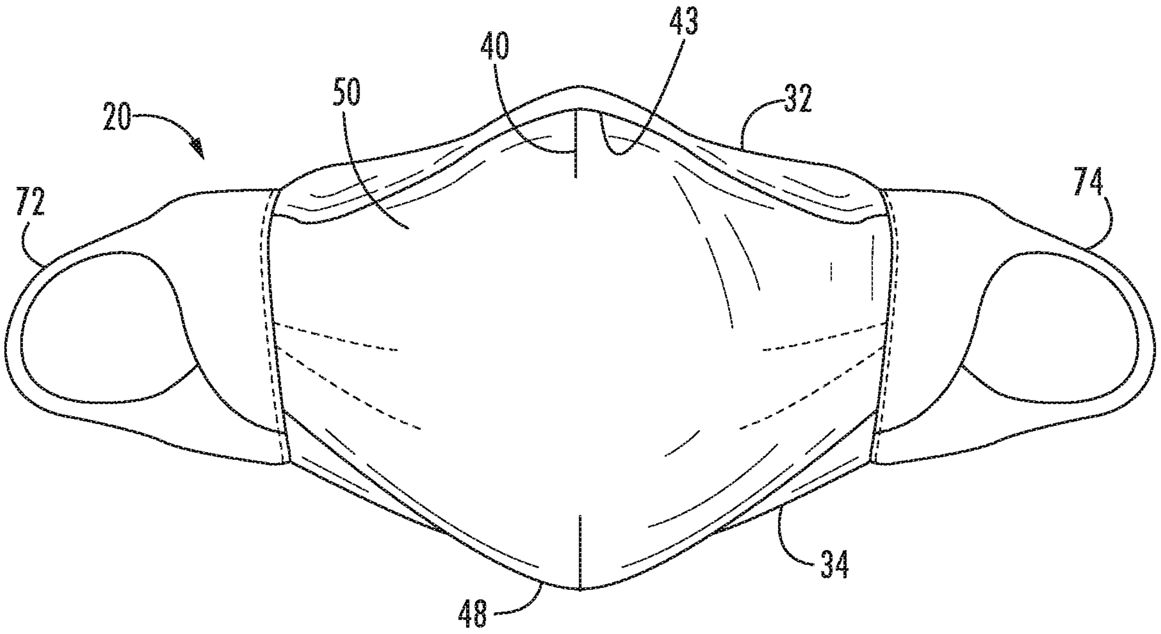
FIG. 11A shows an alternative embodiment of the face mask of FIG. 1, wherein a nose dart is positioned on the body portion of the face shield.
Figure 11B:
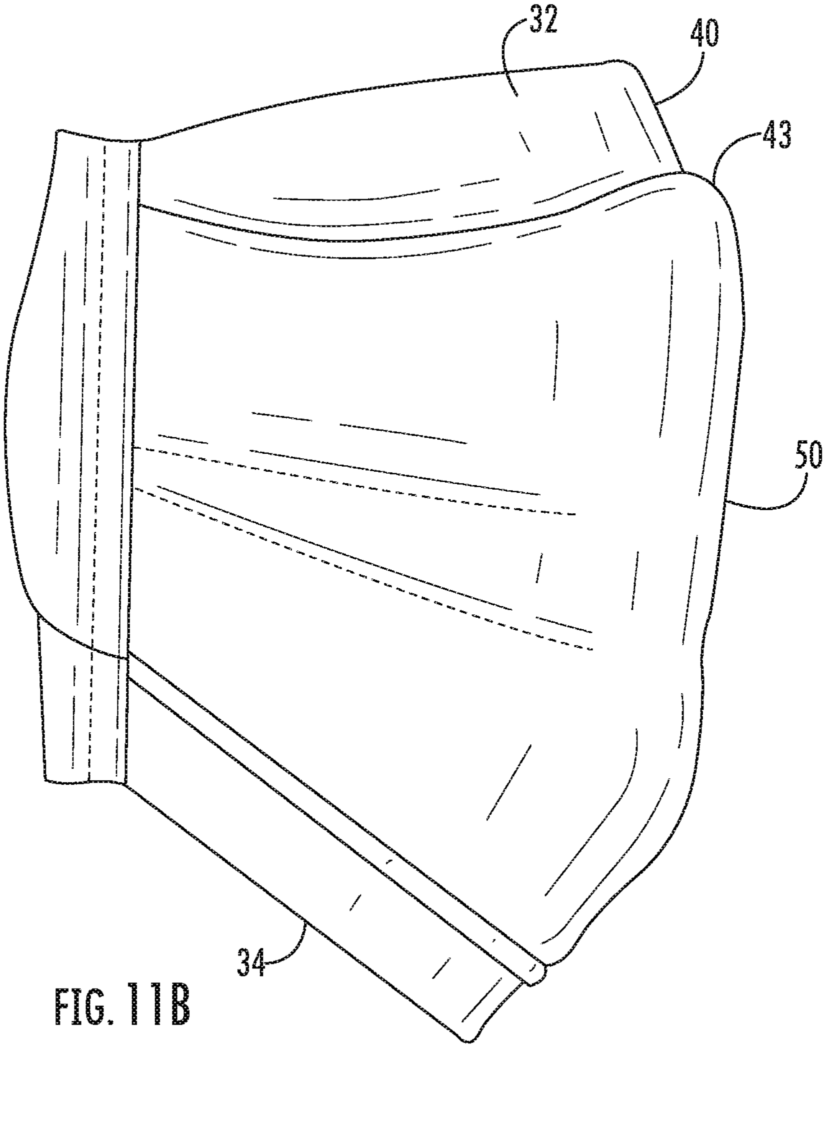
FIG. 11B shows a side view of the face mask of FIG. 11A, illustrating differences in the thickness of different portions of the face shield.

FIG. 11B shows a side view of at least one embodiment the face mask 20 wherein significant differences in the thicknesses of the upper rim 32, lower rim 34 and body portion 50 exist. As shown in the figure, the body portion 50 is significantly puffed out relative to the upper rim 32 and lower rim 34. This is best illustrated by the ledge 43 formed at the upper center of the body portion 50 in the vicinity of the nose dart 40. The ledge 43 illustrates how the upper rim 32 may be retained closely against the wearer's nose and cheeks. However, the thicker body portion 50 has substantial structure and increased body, thus allowing this portion of the mask to maintain a shape and remain removed from much of the wearer's nose, mouth, lips, and surrounding skin. At the same time, the material forming the lower rim 34 is also relatively thin and elastic, similar to the upper rim 32, so the lower rim 34 nicely conforms to the wearer's jaw and chin.

Because the upper rim 32 and the lower rim 34 is formed from the same material that provides the inner layer 56 of the body portion 50, the entire inner layer of the face shield 30 may be formed from a single cut of fabric. In other words, the upper rim 32, inner layer of the body portion 50, and the lower rim 34 are integrally formed from a single sheet of fabric material. In at least one embodiment, manufacture of the three-layer face shield 30 includes first stretching the inner layer 56, subsequently laying the middle layer 54 and outer layer 52 on the inner layer 56, and then applying the stitching 58 in order to combine the three layers together. Thereafter, the elastic is released, and this draws the mask inwardly. When the elastic inner layer 52 is released, the un-stretched middle layer 54 and outer layer 52 are drawn inwardly by the stitching 58 that joins the layers together, and this results in cupping of the face mask into the desired shape.

Figure 4:
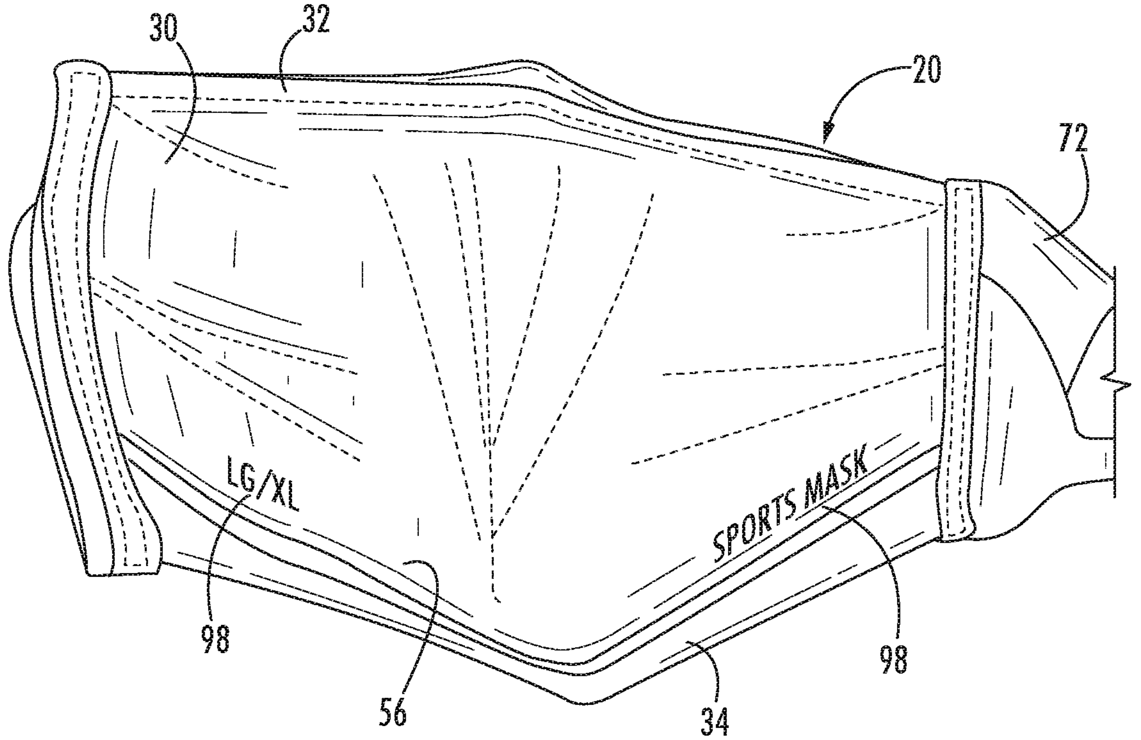
FIG. 4 shows another rear view of the face mask of FIG. 1.

With reference now to FIG. 4, the face mask 20 also includes one or more indicia 98, such as logos or other product information, positioned on the outer surface 52 or inner surface 56 of the face shield 30. The indicia 98 are perforated in order to facilitate air-flow through the indicia. For example, if the indicia is printed or heat pressed on to the face shield, the indicia 98 may include some number of open pixels per unit of area that do not include any ink or other marking material, thus ensuring that filtered air can easily move through all portions of the face shield 30, including locations where the indicia 98 is positioned.

Free-Cut Mounting Straps

With reference now to FIGS. 1-6, the mounting straps 70 are provided by ear loops 72, 74 that respectively extend from the right and left perimeter of the face shield 30. As best illustrated in FIGS. 1, 2 and 6, each of the ear loops 72, 74 are formed from a single sheet of fabric that is void of seams, stitching or other finishing at the edges of the fabric along the length of the ear loops 72, 74 (i.e., the ear loops are "free-cut"). Because the ear loops 72, 74 are free-cut the only significant amount of stitching on the ear loops 72, 74 is along the perimeter of the face shield 30 where the ear loops are attached to the face shield 30. The material used to form the ear loops 72, 74 is the same as that used to form the upper rim 32, lower rim 34 and inner layer 56 of the face shield 30, such as Iso-Chill Heat Gear® fabric sold by Under Armour, Inc. Specifically, the material is a relatively soft, flexible and elastic fabric configured to wick moisture and cool the skin. In at least some embodiments, a combination of elastane, nylon, polyester and/or cotton fibers may be used to provide the fabric (e.g., 77% nylon and 23% spandex). The elasticity and flexibility of the fabric that provides the ear loop, in combination with the fact that no stitching is provided along the length of the ear loop, allows the ear loop to be used with differently sized heads while still properly retaining the face shield 30 against the face of the wearer.

The ear loops 72, 74 are identical in shape. Moreover, the fabric forming the ear loops 72, 74 is the same on both sides (e.g., has an identical texture on both sides). As a result, it does not matter whether a free-cut piece of fabric is used to form the right ear loop 72 or the left ear loop 74. In other words, multiple cuts of identical ear loops may be cut from a single piece of fabric, and each cut may be used to provide either the right ear loop 72 or the left ear loop 74.

With particular reference now to FIG. 6, a free-cut fabric piece 76 is shown that may be used to form either the right ear loop 72 or the left ear loop 74. The piece of fabric 76 is generally elongated and includes a first surface 80, a second surface 82 (see FIG. 1), a wide/enlarged first end wing 84, a wide/enlarged second end wing 86, and a narrow center portion 88 extending between the first end wing 84 and the second end wing 86. As noted above, the fabric 76 is free-cut, so no stitching or other finishing is provided along the edges of the ear loops (except the location where the end wings 84, 86 are secured to the face shield 30).

The first end wing 84 includes a relatively straight forward edge 90 that is configured for attachment along the upper side of the face shield 30, as explained in further detail below. The forward edge 90 is generally about three to five inches in length, depending on the size of the mask. The first end wing 84 also includes a contoured rear edge 92 that is configured to curve around the upper front side of a wearer's ear.

The narrow center portion 88 of the free-cut fabric piece 76 is elongated and significantly narrower than the first and second end wings 84 and 86. In at least one embodiment, the narrow center portion 88 has a length of about four to seven inches, and a width of about ¼ inch to ⅝ inch. The narrow center portion 88 is also somewhat curved as it extends between the first end wing 84 and the second end wing 86. As discussed in further detail below, when the free-cut fabric piece 76 is connected to the face shield 30 to form the left ear loop 74, the narrow center portion 88 is twisted about 90° relative to the first end wing 84 and the second end wing 86.

The second end wing 86 includes a relatively straight forward edge 94 that is configured for attachment along the lower side of the face shield 30. The straight forward edge 94 is generally about three to five inches in length, depending on the size of the mask. The second end wing 86 also includes a contoured rear edge 96 that is configured to curve around the lower front side of a wearer's ear.

As best shown in FIGS. 1 and 2, the free-cut fabric piece 76 is secured to one of the left or right perimeter of the face shield 30 to form one of the ear loops 72, 74. For the sake of simplicity, the free-cut fabric piece 76 shown in FIG. 6 is described in the paragraph below as being secured to the left side of the face shield 30 in order to form the left ear loop 74. However, it will be recognized that another free-cut piece of fabric 76 is similarly coupled to the right side of the face shield 30 to form the right ear loop 72.

The forward edge 90 of the first end wing 84 is secured with stitching along the upper left perimeter of the face shield 30 with the first surface 80 facing outwardly/laterally. The forward edge 90 extends from the left side 88 of the upper rim 32 to a position on the lower left perimeter of the body portion 50. However, the forward edge 90 of the first end wing 84 does not extend all the way to the lower rim 34. Similarly, the forward edge 94 of the second end wing 86 is secured with stitching along the upper left perimeter of the face shield 30 with the first surface 80 also facing outwardly/laterally. The forward edge 94 extends from the left side of the lower rim 34 to a position on the upper left perimeter of the body portion 50. However, the forward edge 94 does not extend to the upper rim 32. As can be seen in FIGS. 1 and 2, the combination of the first end wing 84 and the second end wing 86 extend along the entire left perimeter of the face shield 30. The first end wing 84 and the second end wing 86 also overlap in along a central length of the perimeter such that the overlap extends for most of the left perimeter of the body portion 50. As a result of this connection, the ear loops 72, 74 provide a comfortable and uniform pulling force along the perimeter sides of the face shield 30 when worn by a user. The uniform pulling force of the ear loops 72, 74 in combination with the structural characteristics of the face shield 30 results in a mask that closely engages the skin of the wearer around the perimeter, while also remaining separated from the mouth of the wearer at the interior of the face shield 30. Because the mask 20 properly abuts the skin of the wearer around the perimeter, the mask provides a proper seal against the face of the wearer that further limits the transmission of bodily fluid. At the same time, the separation of the face shield 30 from the mouth of the wearer makes the makes the mask 20 more comfortable during use.

As best illustrated in FIG. 1, when the left ear loop 74 is secured to the mask, the first end wing 84 and the second end wing 86 are stitched along the perimeter of the face shield 30 with the first surface 80 facing outwardly/laterally at both the first end wing 84 and the second end wing 86. As a result of this connection, the narrow center portion 88 of the free-cut fabric is twisted about 90° relative to the first end wing 84 and second end wing 86 (i.e., the second surface 82 at the narrow center portion 88 is oriented about 90° relative to the first surface 80 at both the first end wing wind 84 and second end wing 86). Therefore, the fabric 76 used for the left ear loop 74 forms a sail-like arrangement wherein the first surface 80 of the fabric faces outwardly/laterally at the wings 84, 86, and the second surface 82 of the fabric at the narrow center portion 88 faces forward. Moreover, because the fabric 76 is elastic (e.g., similar to the fabric that forms the inner layer 56 of the face shield) and is free-cut the edges of the fabric tend to bend slightly or roll away when the center portion (which is pivoted 90° relative to the wings 84, 86) is stretched. Therefore, the relatively flat and narrow inner side 82 of the fabric at the narrow center portion 88 of the ear loop 74 is configured to rest comfortably against the rear of the wearer's ear with the edges of the fabric bent away from the skin on the back of the ear. This results in a comfortable configuration with no seams of the fabric engaging the ear of the wearer, thus allowing the wearer to don the mask for long periods of time without becoming overly fatigued by the engagement of the ear loop with the back of the ear.

Operation of the Face Mask

Figure 12:
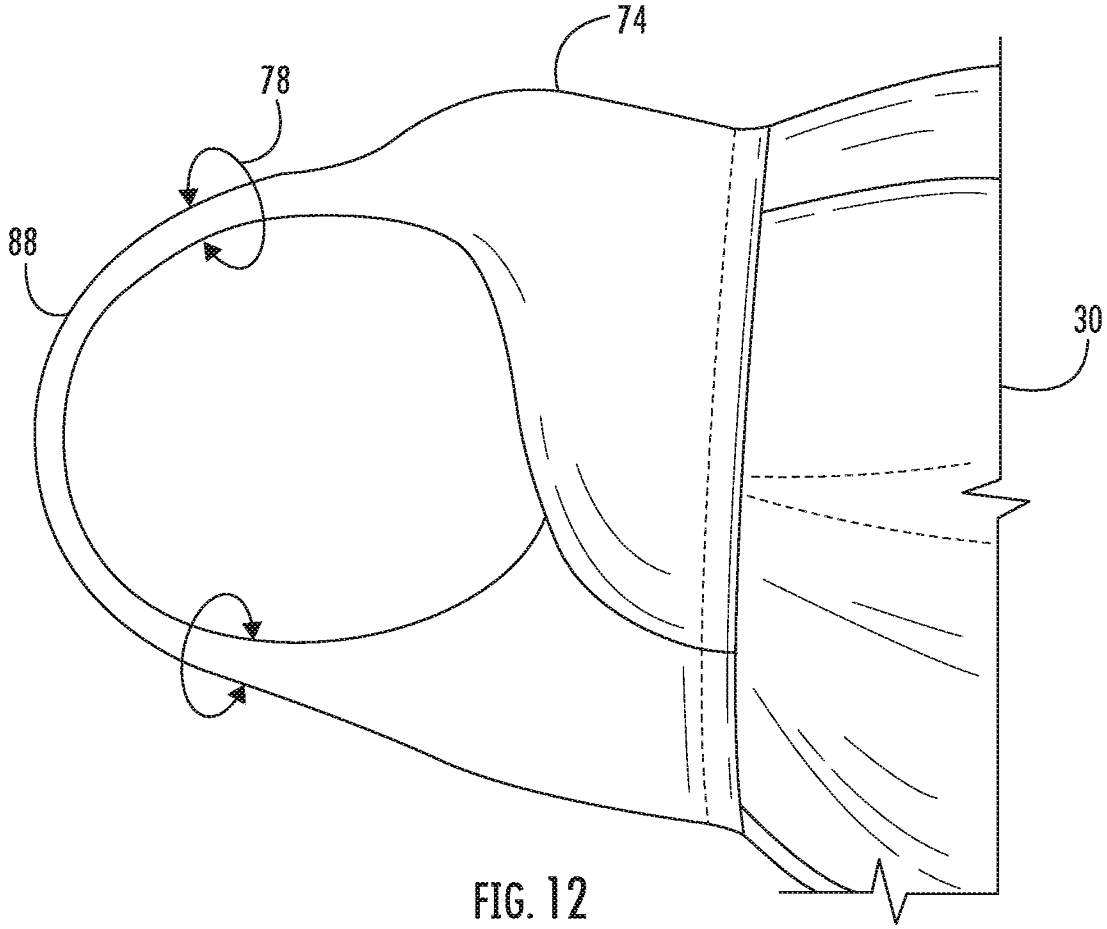
FIG. 12 shows a side view of the ear loops of the face mask of FIG. 1 with the elongated narrow center portion of the ear loops rolled up upon themselves following use.

In operation, the user dons the face mask 20 by placing the face shield over his or her mouth and nose and drawing the ear loops 72, 74 around his or her ears. Because the ear loops 72, 74 are comprised of an elastic fabric, the ear loops may be easily stretched around the back of the user's ears. As noted above, the flat inner side 82 of the ear loops engage the back of the user's ears, resulting in a comfortable fit that does not irritate the ears of the user. Moreover, because the ear loops 72, 74 are comprised of a free-cut stretch fabric, the edges of the fabric along the narrow center portion 88 of the ear loops 72, 74 tend to roll or curl with repeated use. This rolling or curling effect is illustrated in FIG. 12 by arrows 78, showing how the edges tend to curl inwardly, leaving a rounded shape that is comfortable against the skin on the wearer's ears.

The material, shape, and configuration of the ear loops 72, 74, provides a substantially uniform pulling force that is distributed evenly along the entire perimeter edge of the face shield 30. This results in a secure fit for the face mask 20 with the perimeter of the face shield 30 retained closely against the wearer's face. At the same time, the pulling force from the ear loops 72, 74 is not so great to overcome the structure of the face shield 30 and pull the interior of the face shield 30 against the wearer's mouth and lips. Furthermore, the elasticity and flexibility of the ear loop, in combination with no stitching is provided along the length of the ear loops, allows the ear loops to be used with differently sized heads and still properly retaining the face shield 30 against the face of the wearer.

When the mask 20 is in place with the face shield 30 covering the face of the wearer, the three-layer face shield 30 is uniquely designed to provide a face mask with efficient filtration while also providing breathability and comfort for the wearer. The face shield 30 engages the face of the wearer in certain locations but provide separation from the face of the wearer in other locations. In particular, the entire perimeter of the face shield 30 is configured to provide a proper seal against the face of the wearer that is substantially free of large gaps associated with typical face shields. The flexible, elastic and flexible nature of the inner layer 56 that extends across the entire inner layer of the face shield 30, including the upper rim 32 to the lower rim 34 facilitates this seal. At the same time, the outer layer 52 covering the body portion 50 of the face shield 30 is designed to provide structure that helps keep the interior of the face shield 30 away from the nostrils and mouth of the wearer. As noted above, the stitching 58 on the face shield 30 also provides structure the keeps the mask away from the mouth and nostrils of the wearer.

When the user wishes to remove the face mask 20 from his or her face, the ear loops 72, 74 are removed from the back of the ears, and the mask 20 easily falls away from the face of the user. If desired, the mask 20 may be easily and conveniently worn around the wrist of the wearer as a temporary holding spot when it is not worn on the face. To do this, the ear loops 72, 74 are first aligned and brought into engagement with one another. When this is done, the structure of the mask 20 is such that the face shield 30 is slightly folded upon itself along the stitching 58. The user then inserts his or her hand into the opening defined both the two aligned ear loops 72, 74. The sizes of the ear loops 72, 74 are such that they will need to stretch to some extent to allow passage of a typical adult human hand. As the user's hand is inserted into the ear loops 72, 74, the ear loops stretch and the associated opening expands to an extent that allows the user's hand to pass through the ear loops. After the hand passes completely through the ear loops 72, 74, the ear loops contract and engage the wrist of the user. Because the hand of the user is larger than the openings defined by the ear loops 72, 74, the face mask does not easily fall away from the user's wrist. Also, because the mask 20 is slightly folded on itself, this provides some level of protection for the inner layer 56 of the face shield 30 when it is worn on user's wrist. When the user wishes to return the face mask 20 to his or her face, it is conveniently accessible by simply removing the face mask from the user's wrist and positioning the mask on the user's face.

As described above, the face mask 20 disclosed herein provides for increased airflow, a performance fit, and a cool feel for the user, all in a sustainable configuration. The face mask 20 is comprised of a light and soft, but structured, fabric configured to stay off the mouth of the wearer but still allow air to flow therethrough. The fit of the face mask 20 is secure, but not tight. The soft, adjustable nose bridge 42 and upper rim 32 allow for a snug fit under glasses, if worn by the user. The interior fabric of the face mask (i.e., inner layer 56) is comprised of a fabric configured to disperse heat, so the mask feels cool when the user dons the mask. The face mask 20 is fully washable, durable, and ready for repeated wear. As a result, the face mask 20 is more environmentally-friendly than conventional disposable masks or filters.

ALTERNATIVE EMBODIMENTS

Figure 13C:
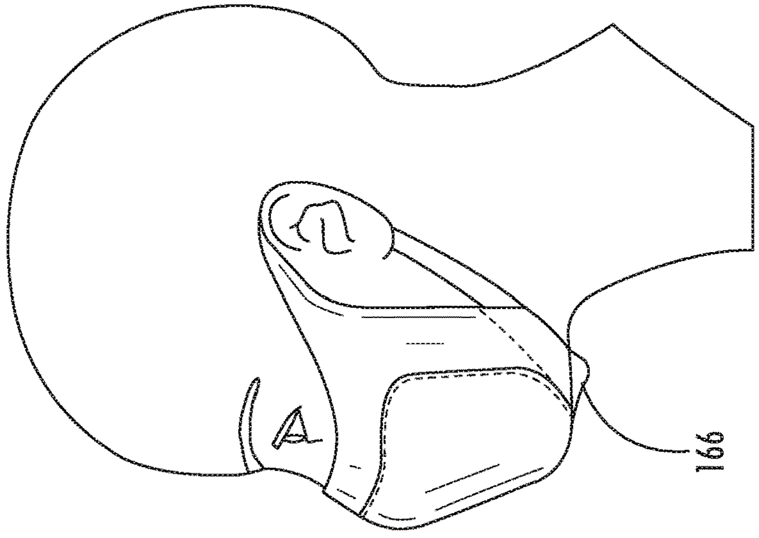
FIG. 13C shows a left side view of the face mask of FIG. 13A with the fit adjust feature concealed.
Figure 13B:
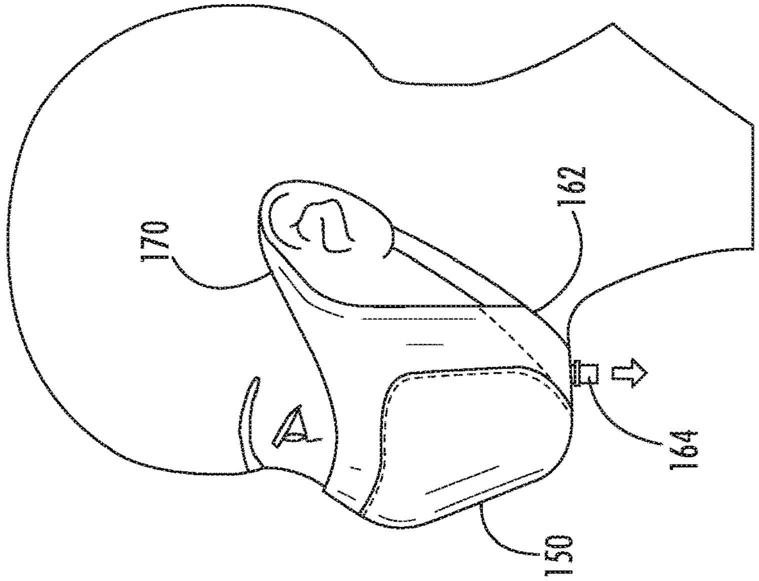
FIG. 13B shows a left side view of the face mask of FIG. 13A.
Figure 13A:
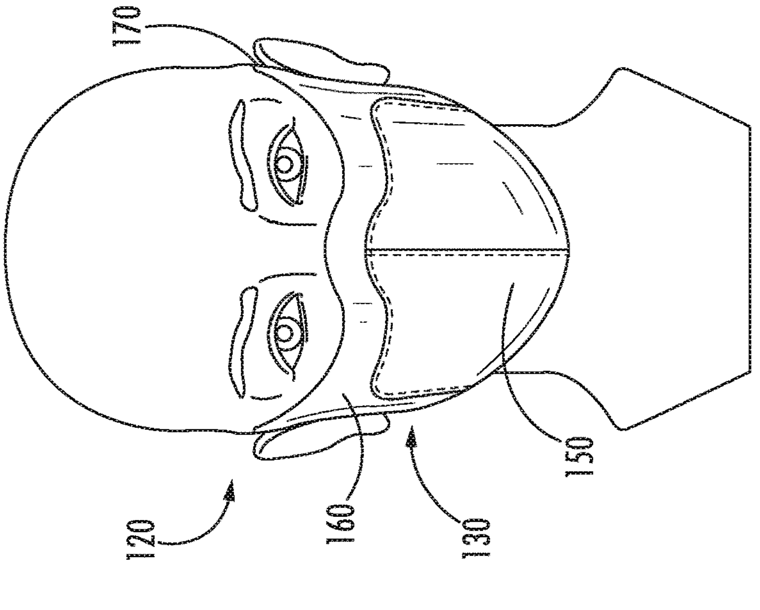
FIG. 13A shows a front view of an alternative embodiment of the face mask of FIG. 1 worn on a human head, the face mask including a fit adjust feature for the ear loops.

FIGS. 1-10 illustrate one embodiment of the face mask, and FIGS. 11A-12 illustrate a related embodiment. However, it will be appreciated that numerous different embodiments of the face mask are contemplated. For example, with reference now to FIGS. 13A-13C, an alternative embodiment of the face mask is provided to include fit-adjust ear loops. The face mask 120 includes a face shield 130, similar to that described above with reference to FIGS. 1-10. However, in the embodiment of FIGS. 13A-13C, the three-layer body portion 150 of the face shield 130 is surrounded by a single layer rim 160 that extends seamlessly into the ear loops 170. Moreover, the ear loops 170 are configured to extend around the ear and into channels 162 positioned on the lower left and right sides of the rim 160 of the face mask. Each ear loop 170 extends from a first open end to a second open end of the associated channel 162, and are slideable within the channels 162. The ends of the ear loops 170 are coupled to a cord lock 164 positioned under the chin at the second open end of the channels on the lower portion of the rim 160. By pulling on the cord lock 164, the wearer may shorten the effective length of the ear loops to a desired fit. Conversely, by loosening the cord lock 164, the wearer may effectively lengthen the ear loops. As shown in FIG. 13C, when the wearer is finished adjusting the ear loops to a desired length, the cord lock 164 fits in a convenient pouch 166 under the chin of the wearer.

Figure 14C:
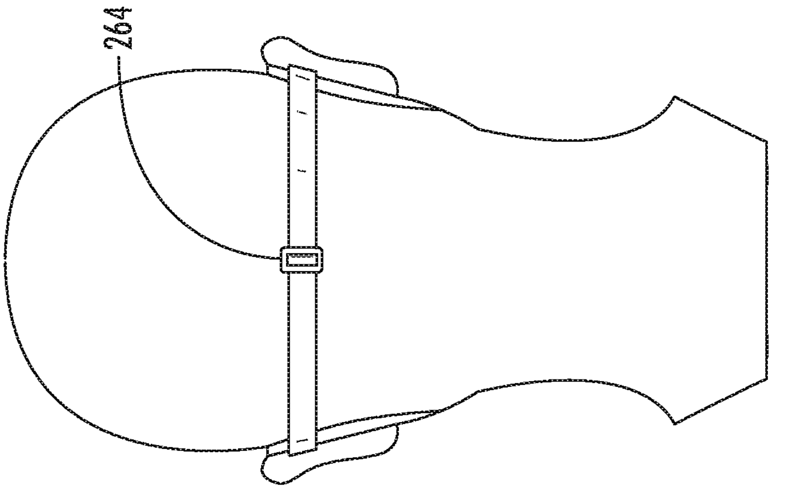
FIG. 14C shows a rear view of the face mask of FIG. 14A.
Figure 14B:
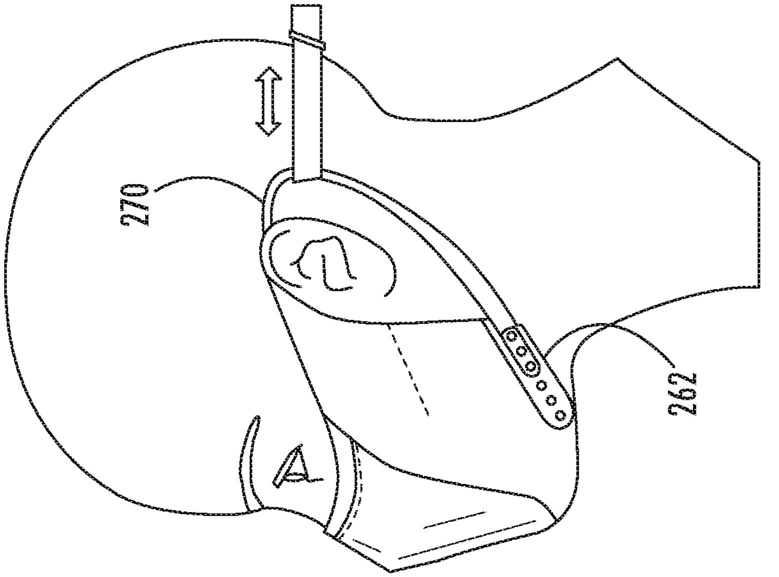
FIG. 14B shows a left side view of the face mask of FIG. 14A.
Figure 14A:
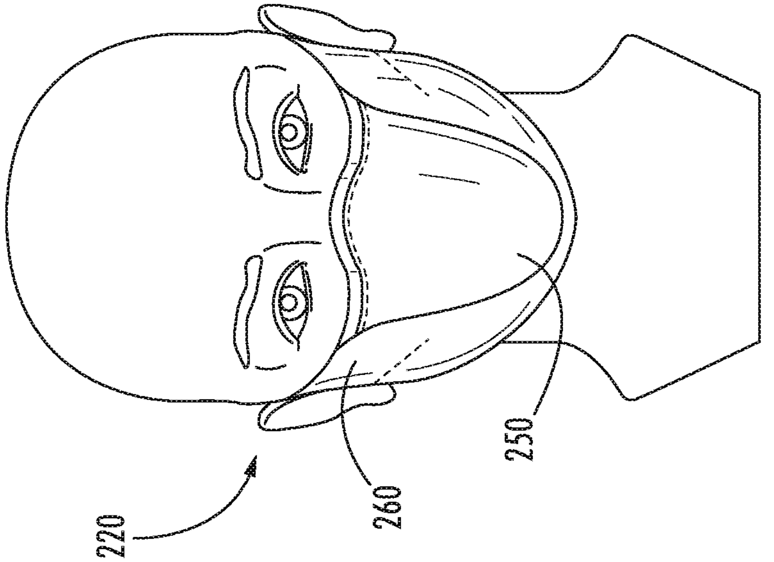
FIG. 14A shows a front view of another alternative embodiment of the face mask of FIG. 1 worn on a human head, the face mask including a fit adjust feature for the ear loops and an additional ear relief strap.

With reference now to FIGS. 14A-14C, another alternative embodiment of the face mask is shown. The embodiment of FIGS. 14A-14C is similar to that of FIGS. 13A-13C, and the face mask 220 includes a three-part body portion 250 surrounded by a single layer rim 260 (which in some embodiments may include two layers of one material). However, the face mask 220 of FIGS. 14A-14C includes ear loops 270 with ends that are adjustable along an outer surface of the rim 260. In particular, the ends of the ear loops 270 include a series of slots configured to receive a series of pins 262 that extend outwardly from the lower portion of the rim 260. The pins are comprised of a somewhat deformable resilient material, such as polyvinyl chloride or another thermoplastic polymer. The wearer may effectively lengthen or shorten the ear loops to a desired fit by moving the slots on the end of the ear loop to engage different pins 262 on the rim 260. Additionally, in the embodiment of FIGS. 14A-14C, the ear loops include a rear strap that provides a tether 264 extending between the ear loops 270 at the rear of the head of the wearer. This tether 264 provides ear relief by moving the ear loops completely off of the wearer's ear, and conforming the mounting straps from ear loops to rear-tie/rear-connection straps.

Figure 15B:
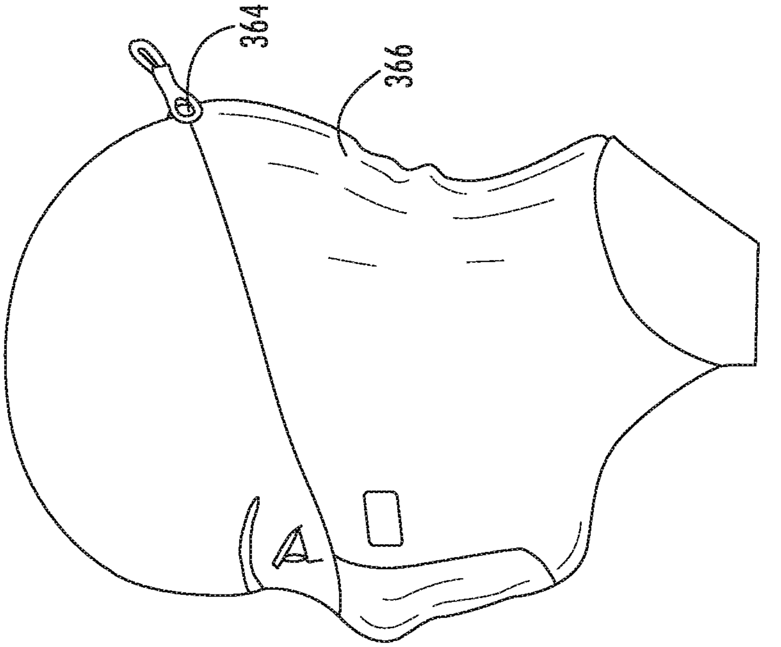
FIG. 15B shows a left side view of the face mask of FIG. 15A.
Figure 15A:
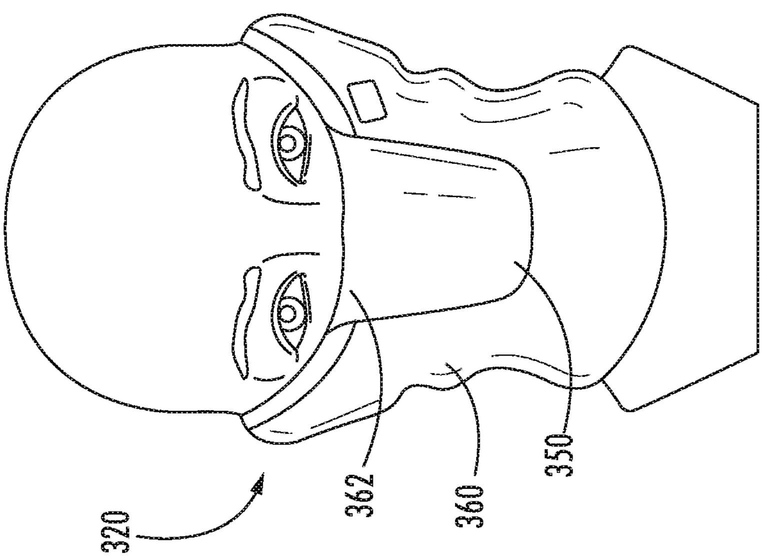
FIG. 15A shows a front view of yet another alternative embodiment of the face mask of FIG. 1 worn on a human head, wherein the mounting straps extends around the back of the head.

With reference now to FIGS. 15A-15B, yet another alternative embodiment of the face mask is shown in the form of a neck gaiter face mask 320. The embodiment of FIGS. 15A-15B is similar to that of FIGS. 14A-14C, and the face mask 320 includes a three-part body portion 350 on the face shield surrounded by a single layer rim 360 (which in some embodiments may include additional features such as a nose bridge along an upper portion 362 of the rim 360). However, the face mask 320 of FIGS. 15A-15B does not include ear loops. Instead, the rim 360 is configured to extend completely around the head of the wearer, thus resulting in a neck gaiter configuration for the face mask 320. As shown in FIG. 15B, an elastic cord extends through a channel formed in the upper portion 362 of the rim 360. The end of the elastic cord exits the channel at an upper rear opening where it is coupled to a cord lock 364. By pulling on the cord lock 364, the wearer tightens the elastic cord in the channel to a desired fit. Conversely, by loosening the cord lock 364, the wearer loosens the elastic cord around his or her head. As shown in FIG. 15B, in at least one embodiment, the neck gaiter face mask 320 includes an interior pouch 366 that allows the entire neck gaiter to be packed therein.

Figure 16A:
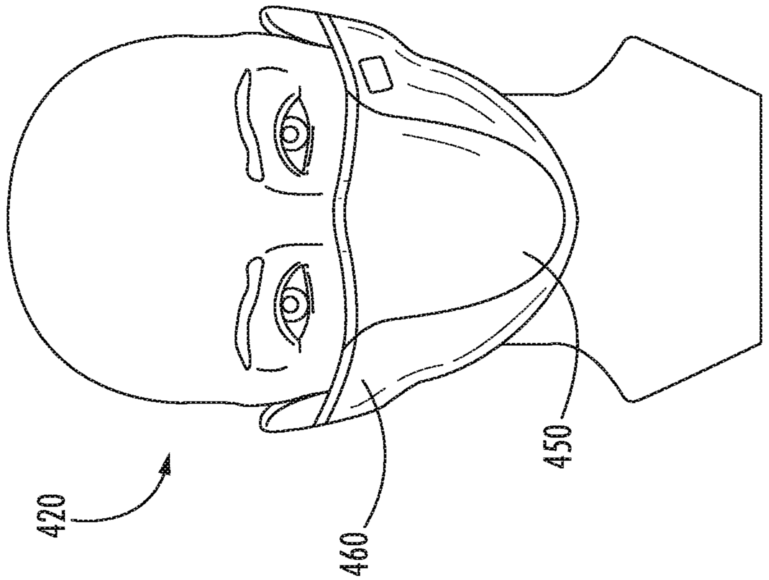
FIG. 16A shows a front view of yet another alternative embodiment of the face mask of FIG. 1 worn on a human head, wherein the headgear and face mask form a neck gaiter.
Figure 16B:
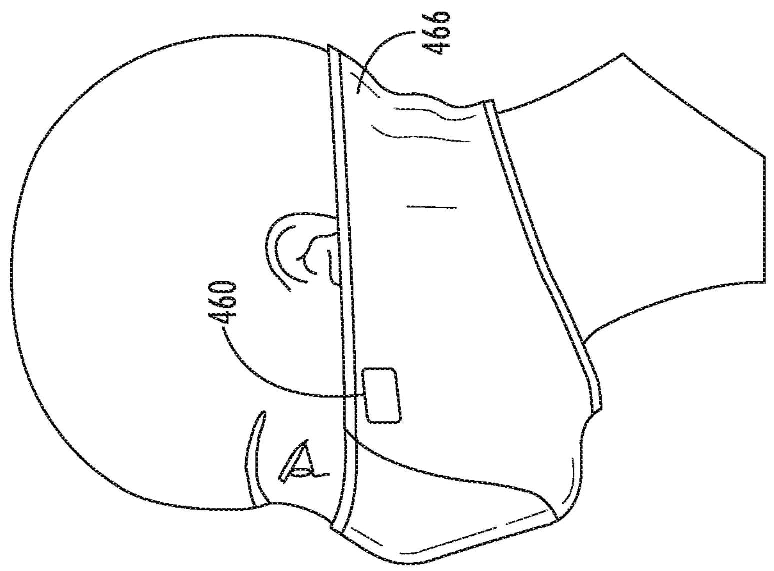
FIG. 16B shows a left side view of the face mask of FIG. 16A.

With reference now to FIGS. 16A-16B, an alternative embodiment of the neck gaiter face mask of FIGS. 15A-15B is shown. The embodiment of FIGS. 16A-16B is similar to that of FIGS. 15A-15B, and the face mask 420 includes a three-part body portion 450 on the face shield surrounded by a single layer rim 460. Again, the rim 460 is enlarged to extend completely around the head of the wearer, resulting in a gaiter configuration for the facemask. However, in the embodiment of FIGS. 16A-16B, the rim portion 460 is shorter than that of FIGS. 15A-15B. Accordingly, the configuration of FIGS. 16A-16B may be preferred for some warmer environments, while the configuration of FIGS. 15A-15B may be preferred for some colder environments. Furthermore, the elastic cord is completely enclosed in the upper portion of the rim 460 in the embodiment of FIGS. 16A-16B. As a result the tension of the elastic is dependent on the size of the wearer's head. Nevertheless, it will be recognized that in other embodiments, the adjustable elastic strap with cord lock of FIGS. 15A-15B may also be included with the gaiter. Furthermore, while the embodiment of FIGS. 16A-16B includes an interior pouch 466, in other embodiments, no such pouch may be included. Thus, it will be recognized that numerous embodiments of the face mask are contemplated and various features described herein may be advantageously included or not included in other features, depending on the desired arrangement.

The foregoing detailed description of one or more embodiments of the face mask has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by any appended claims. Therefore, the spirit and scope of any appended claims should not be limited to the description of the embodiments contained herein.

What is claimed is:

1. An article of apparel configured to cover at least part of a human head, the article of apparel comprising:

a multi-layer face shield configured to cover a mouth and a nose of the human head when the article of apparel is donned by a wearer, the multi-layer face shield comprising an outer layer, a middle layer and an inner layer, wherein the inner layer of the face shield is provided by a stretch fabric, and wherein the middle layer of the face shield is provided by an open cell foam, and wherein the outer layer of the face shield is provided by a stitched fabric spacer; and a fabric panel coupled to the face shield and forming a posterior loop such that the fabric panel and face shield are configured to extend completely around the human head when the article of apparel is donned by the wearer.

2. The article of apparel of claim 1, wherein the fabric panel provides a rim extending along at least along opposing lateral perimeter lengths of the face shield.

3. The article of apparel of claim 2 wherein the fabric panel is a single-layer panel provided by the stretch fabric.

4. The article of apparel of claim 1 wherein the inner layer of the face shield is provided by a first stretch fabric, and wherein the fabric panel is provided by a second stretch fabric that is different than the first stretch fabric.

5. The article of apparel of claim 4 further comprising an anti-microbial compound provided on the first stretch fabric.

6. The article of apparel of claim 1 further comprising a durable water repellant finish provided on the outer layer of the face shield.

7. The article of apparel of claim 1 wherein the article of apparel is a gaiter.

8. The article of apparel of claim 1 wherein the fabric panel includes a neck portion configured to surround a neck of the wearer when the article of apparel is donned by the wearer.

9. The article of apparel of claim 1 wherein the face shield defines a first thickness and the fabric panel defines a second thickness, wherein the first thickness is substantially greater than the second thickness.

10. The article of apparel of claim 1 further comprising a channel formed in an upper portion of the fabric panel and extending around the posterior loop, and an elastic cord positioned in the channel.

11. The article of apparel of claim 1 further comprising an interior pouch positioned on the fabric panel.

12. The article of apparel of claim 1 further comprising an elastic strap coupled to the fabric panel, the elastic strap configured to extend over an ear of the human head when the article of apparel is donned by the wearer.

13. An article of apparel configured to cover at least part of a human head, the article of apparel comprising:

a multi-layer face shield configured to cover a mouth and a nose of the human head when the article of apparel is donned by a wearer, the face shield comprising an outer layer provided by a stitched fabric spacer, a middle layer provided by an open cell foam, and an inner layer provided by a stretch fabric; and a fabric panel coupled to the multi-layer face shield and forming a posterior loop such that the fabric panel and face shield are configured to extend completely around the human head when the article of apparel is donned by the wearer.

14. The article of apparel of claim 13, the article of apparel further comprising a single-layer rim extending along a perimeter of the face shield and forming a posterior loop such that the rim and face shield are configured to extend completely around the human head when the article of apparel is donned by the wearer.

15. The article of apparel of claim 14 wherein the single-layer rim is further configured to surround a neck of the wearer when the article of apparel is donned by the wearer.

16. The article of apparel of claim 15 wherein the article of apparel is a gaiter.

17. An article of apparel configured to cover at least part of a human head and a human neck, the article of apparel comprising:

a multi-layer face shield configured to cover a mouth and a nose of the human head when the article of apparel is donned by a wearer, the face shield comprising an outer layer provided by a stitched fabric spacer, a middle layer provided by an open cell foam, and an inner layer provided by a stretch fabric, the face shield defining an upper perimeter, a lower perimeter, and opposing lateral perimeters; and a fabric panel extending around at least the lower perimeter and the opposing lateral perimeters of the face shield, the fabric panel forming a posterior loop and a neck portion, wherein the posterior loop is configured to extend around a posterior the human head and the neck portion is configured to surround the human neck when the article of apparel is donned by the wearer.

* * * * *